UNITED STATES PATENT OFFICE.

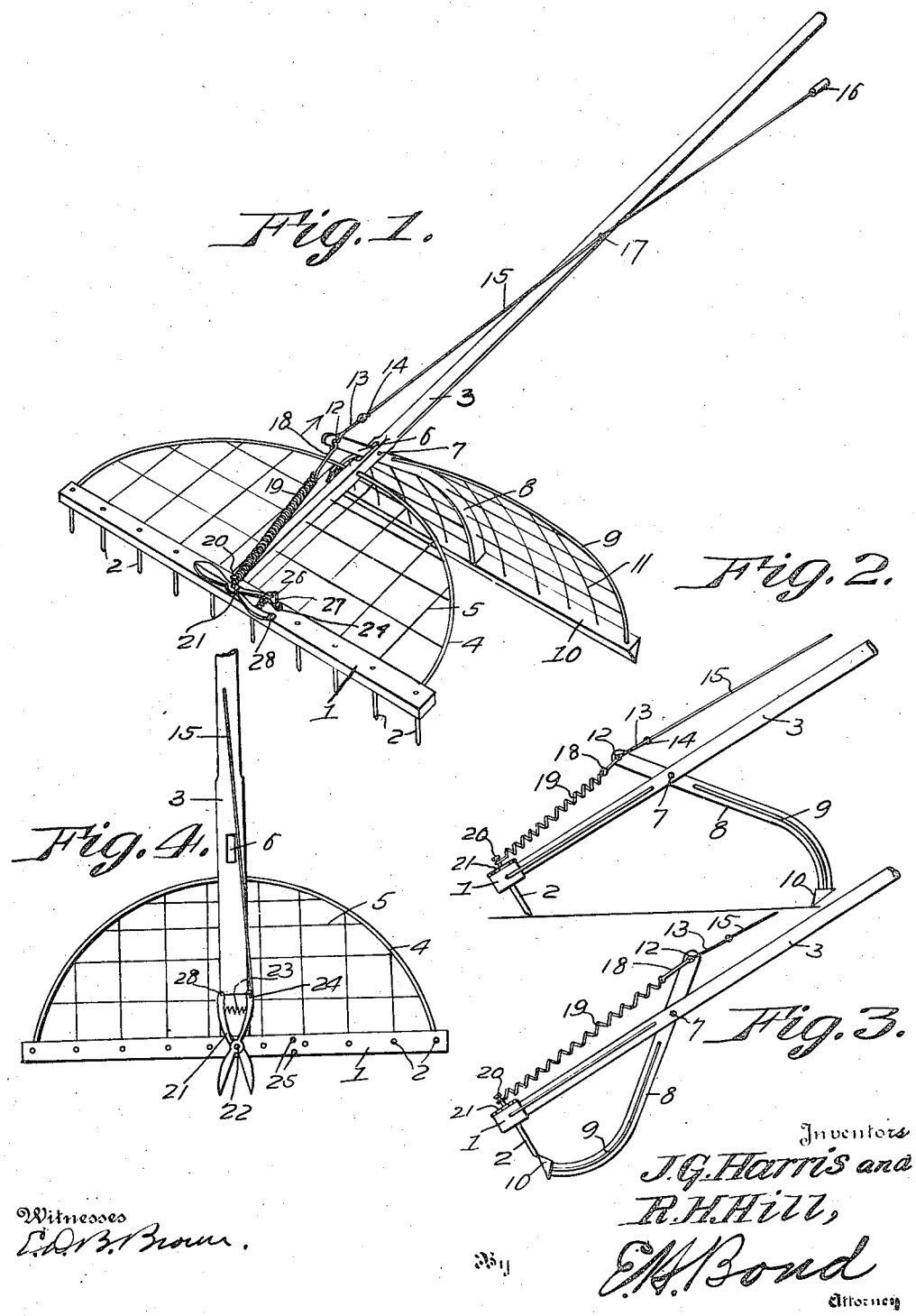

JULIUS G. HARRIS, OF PHILADELPHIA, PENNSYLVANIA, AND ROBERT H. HILL, OF WILMINGTON, DELAWARE.

HAND-RAKE.

1,160,282.

Specification of Letters Patent.

Patented Nov. 16, 1915.

Application filed June 22, 1915. Serial No. 35,574.

*To all whom it may concern:*

Be it known that we, JULIUS G. HARRIS and ROBERT H. HILL, citizens of the United States, residing at Germantown, Philadelphia, county of Philadelphia, and State of Pennsylvania, and Wilmington, county of New Castle, and State of Delaware, respectively, have invented certain new and useful Improvements in Hand-Rakes, of which the following is a specification.

This invention relates to certain new and useful improvements in hand rakes and it has for its objects among others to provide a simple and improved construction, of few parts and those readily assembled and disassembled and which shall be efficient and reliable in its action.

We provide a rake having means for easily and conveniently removing the cut grass or any waste from the lawns or gardens without transferring to a fork or other utensil.

A rake constructed in accordance with our invention can be easily handled by any one and without the necessity of the operator stooping over.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification; and in which—

Figure 1 is a perspective view of our improved rake. Fig. 2 is a side elevation thereof, with the scoop open. Fig. 3 is a similar view showing the scoop closed. Fig. 4 is a top plan with the scoop removed, showing the clippers in operative position.

Like numerals of reference indicate like parts throughout the different views.

Referring to the drawings, 1 designates a rake head provided with the rake teeth 2. 3 is the handle and 4 a curved support secured to the handle and rake head and supporting a screen 5, as seen best in Fig. 1. The handle is provided with a vertically disposed longitudinal slot 6 in which is pivotally mounted, as upon a removable pin 7, the curved arm 8 which carries the curved frame 9 and the bar 10, which latter is beveled, as seen best in Figs. 1, 2 and 3, and to which bar 10 and frame 9 is secured the reticulated medium 11 constituting the scoop. The curved arm 8 extends upward through the slot and has secured thereto, as at 12, one end of a hook 13, to the other end of which is attached, as at 14, a cord or the like 15, the other end of which extends within convenient reach of the outer end of the handle and is provided with a suitable handhold or the like 16. This cord or ligament 15 passes through a staple or the like 17 on the handle 3 to guide the same and keep it from falling out of reach.

18 is a hook connected at one end to the upper end of the arm 8 and having connected with its other end one end of a spring 19, the other end of which is connected to the rake head 1, as at 20.

The operation is as follows: The device may be used as a rake in the ordinary manner, the scoop being normally in the position in which it is seen in Figs. 1 and 2. When it is desired to collect the grass or waste which has been raked up by the rake, the cord 15 is pulled which moves the upper end of the arm 8 in the direction of the arrow in Fig. 1, throwing the scoop from the position seen in Figs. 1 and 2 into that seen in Fig. 3, gathering up the cut grass or trash or waste, the bar 10 of the scoop coming in contact with the teeth 2, as seen in Fig. 3, and preventing escape of the grass etc. Clippers 21 are pivotally mounted, as at 22, on the rake head; a spring 23 being employed between the clipper arms, as seen best in Fig. 4. The clippers are mounted upon the upper side of the rake head and when not in use may be disposed lengthwise of the rake head, as seen in Fig. 1, being kept there permanently, being fastened by means of a pin 24 passed through an opening in one clipper arm into an opening 25 in the rake head. When the pull on the cord 15 is released, the spring 19 will return the scoop to its normal position, as seen in Fig. 2. When it is desired to operate the clippers, the rake is turned over with the teeth upward, the cord 15 is disconnected from the arm 7 and the spring 19 is disconnected from said arm and from the rake head and then the scoop and the spring are removed. The cord 15 is then attached to the clipper arms, being passed through an opening 26 in a lug 27 rising from one clipper arm and secured in an opening 28 in the end of the other clipper arm, the pin 24 being removed and the clippers turned into a position at right angles to the length of the rake head 1. Each pull of the cord 15 makes one cut of the clippers, and after each cut the spring 23 serving to open the clippers. The pin 24 is passed through the opening in the clipper arm so as to secure the said arm to the handle ready for operation.

No claim is made herein to the clipper attachment.

Modifications in details may be resorted to without departing from the spirit of the invention or sacrificing any of its advantages.

What is claimed as new is:—

1. A rake head, a handle, a screen carried thereby, a scoop supporting arm pivotally mounted on the handle, an operating ligament connected with said arm above the handle, a spring extending in alinement with said ligament and connecting said arm above the handle with the rake head, a reticulated scoop carried by the scoop supporting arm, and a transverse bar carried by said supporting arm.

2. A rake head, a handle, a screen carried thereby, a scoop supporting arm pivotally mounted on the handle, an operating ligament connected with said arm above the handle, a spring extending in alinement with said ligament and connecting said arm above the handle with the rake head, a reticulated scoop carried by the scoop supporting arm, and a transverse bar carried by said supporting arm and tapered and adapted to engage the teeth of the rake head when the scoop is in its closed position.

In testimony whereof we affix our signatures in presence of two witnesses.

JULIUS G. HARRIS.
ROBERT H. HILL.

Witnesses:
MARY E. HANEY,
ROBERT RUSSELL.